United States Patent [19]

Leroux

[11] Patent Number: 4,671,962
[45] Date of Patent: Jun. 9, 1987

[54] CHICORY BASE DRINK AND METHOD OF PREPARING SAME

[75] Inventor: Alain A. A. Leroux, Orchies, France

[73] Assignee: S.A.R.L. "Chicoree Leroux", Orchies, France

[21] Appl. No.: 833,235

[22] Filed: Feb. 27, 1986

[30] Foreign Application Priority Data

Dec. 10, 1985 [FR] France ................. 85 18640

[51] Int. Cl.⁴ .................. C12G 1/00; C12G 3/00; A23L 2/02
[52] U.S. Cl. ...................... 426/51; 426/52; 426/599
[58] Field of Search ............ 426/42, 43, 49, 51, 426/52, 599, 615, 13, 596

[56] References Cited

U.S. PATENT DOCUMENTS 3,950,558 4/1976 Tansky ..................... 426/596
4,579,739 4/1986 Darbyshire et al. ........... 426/13

Primary Examiner—Robert Yoncoskie
Assistant Examiner—Marianne M. Cintins
Attorney, Agent, or Firm—Collard, Roe & Galgano

[57] ABSTRACT

A chicory base refreshing drink is prepared from a chicory root extract solution by causing a sugared chicory juice to be fermented by using a Kefir type ferment. The solution is obtained by maceration, decoction or infusion of roasted or dried chicory roots, and sugared to yield a 6-percent saccharose concentration in the end product. Preferably, the sugar consists of a mixture of molasses and pure sugar with molass contents of the third-crop sirup in excess of 81.6 g/liter, the fermentation process being controlled by measuring the acidity rate which is kept preferably at 2.5 percent after 70 hours.

10 Claims, 2 Drawing Figures

CHICORY BASE DRINK AND METHOD OF PREPARING SAME

BACKGROUND OF THE INVENTION

This invention relates to a chicory base drink and to a method of preparing such drink. It is applicable notably in the food industry for the production of refreshing beverages.

Chicory is a product which has been known for a long time, since traces thereof dating as far as 4,000 years b. J.C. has been discovered. This plant was then used regularly and very appreciated as a digestive and appetizing stimulator. Various manuscripts refer to chicory, notably in Athens, Alexandria and Roma.

Already in those old times, the therapeutic properties of chicory had been acknowledged.

More particularly, the digestion of food is facilitated by the action exerted by chicory on salivation, deglutition and the absorption in the stomach through the stimulation of the stomach glands, and also of the pancreatic and biliary juices. Chicory acts as a cholagogue since it promotes the biliary secretion and the discharge of the bile liquid through the intestine. Furthermore, chicory acts as a regulator of the gastro-intestinal system without being drastic under any circumstances.

Various researches proved the action exerted by chicory on the intestine glands and on the peristaltic movements of the intestine. More recent investigations proved that its action is also effective on the central nervous system (Winckel), on the circulatory system (Paechtner), on the heart (Baelden, Bauderon, Chaumeton, Hamel, Muller, Parturier), on the kidneys (Bel, Leclerc, Parturier, Decaux), on the blood (Clément, Planchon), on the skin (Decaux, Chaumeton, Muller).

Chicory is a detoxicator and promotes lactation. It is administered favorably to diabetics (Wolf).

Chicory is acknowledged as constituting a bitter, non-irritating, diuretic and slightly laxative tonic product.

Chicory is free from any noxious effect and has no known contraindications.

Tacquet and Beerens did not report any toxicity of chicory solutions administrered by the oral route at daily doses of 60 grams during six months to voluntary, healthy human individuals. The study shows the absence of glycemic sag in diabetics after the absorption of a large amount of chicory, as well as a bradycardiac action (in contrast to caffein, a tachycardiac stimulator), and an acceleration the intestinal transit due to the considerable fructose contents of chicory.

To sum up, the medical properties of chicory are such that this product can be regarded as constituting a favorite hygienic drink.

However, up to now, chicory has constantly been absorbed in the form of a pure infusion or in admixture with other products, such as coffee.

Considering the alimentary habits of man, this mode of utilizing chicory limits its use to warm beverages usually absorbed in the morning during breakfast.

It is regrettable to deny oneself of a drink having many favorable properties by sheer force of habits. It is the essential purpose of the present invention to provide a chicory base refreshing drink that can be absorbed for the benefit of one's health at any time of the day.

The preparation of chicory for this purpose is extremely delicate for many difficulties must be overcome. More particularly, it is necessary to develop a product having organoleptic properties likely to be appreciated by a large majority of individuals, if not by all. Of course, the therapeutic properties of chicory should not be impaired or destroyed by inappropriate adjuncts, and finally the chicory-base drink should be such that it can be produced on a commercial scale, that is, in large quantities, at a relatively low cost, and furthermore taste and beneficial properties of the resulting product should remain constant.

The research work for perfecting this product was directed primarily toward the obtaining of a chicory-base fermented beverage. In fact, fermentation provides a product having a tonic, slightly bitter taste, therefore ideally suited for making a refreshing drink.

However, due to its particularly alive nature, chicory does not ferment easily and up to now no traditional ferment proved to be really efficient for properly reacting with chicory.

SUMMARY OF THE INVENTION

The chicory base drink according to the present invention, which is intended to constitute a refreshing beverage obtained from a chicory solution, is characterised by the fact that it is the product of a fermentation of sugared chicory juice by using a ferment of the Kefir type.

The method of preparing a chicory base drink, in which the basic material is an extract solution of roasted chicory roots which is obtained by maceration, decoction or infusion of roasted or dried chicory roots or chips, is characterised in that it comprises the steps of:

sugaring the chicory extract solution,
fermenting the sugared chicory extract solution by using a Kefir-type ferment,
controlling the fermentation step, and
filtering the fermented solution.

The invention will be better understood as the following description proceeds with reference to the accompanying drawings.

THE DRAWINGS

FIG. 1 is a synoptic diagram showing an experimental plant for producing a chicory base fermented drink, and FIG. 2 is a diagrammatical illustration of an industrial plant for producing the chicory base fermented drink according to the instant invention.

DESCRIPTION OF THE PREFERRED EMBODIMENT

Figure 1:
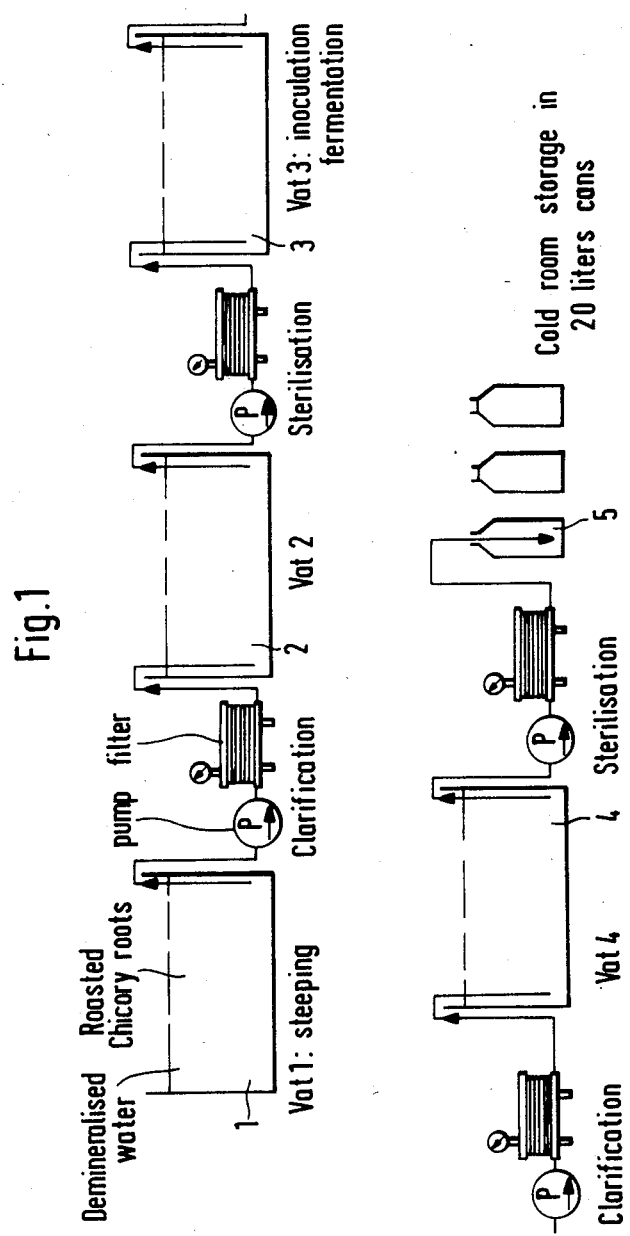

The present invention relates to a chicory base drink and to the method of preparing same. It is applicable notably in the food industry for the production of refreshing beverages.

The so-called coffee chicory, or *Cichoryum intybus* L (family Asteraceae or Compositae) is a bi-annual plant widely known for the bright blue color of its ligulated flowers. The plant may rise to a height of one meter and blooms from July to October. It has articulated lactiferous cells. The long, fleshy taproots, when roasted and ground, constitute a product having definitely inherent and specific properties and, on the other hand, may be used as an addition to coffee.

Up to now, chicory has been used chiefly in the form of pure infusion as complement to coffee.

Considering the many beneficial characteristics of chicory, one can only regret the limitation of its consumption in the form of warm drink, taken generally with breakfast.

However, in contrast to coffee which is a seed and tea which is a leaf, chicory prepared for human consumption is a root, i.e. a particularly lively product which is rather difficult to work up. More especially, chicory roots constantly tend to develop spouts.

It is the primary object of the present invention to develop a technical process for obtaining a chicory base refreshing drink.

A refreshing drink must necessarily be slightly sweet and have a moderate tonic and bitter taste in order to enhance the 'fresh' feeling given by the product.

Moreover, the conversion of chicory should not impair its positive properties.

To realize the various objects mentioned hereinabove, the reserarch work was directed toward the fermentation of a chicory juice, however with one restriction, namely, avoiding the production of a high-alcoholometry drink.

From the onset, it is known that it is not possible to find a ferment compatible with a chicory juice. In fact, chicory is a living product incorporating many ferment inhibitors, thus preventing it from reacting to the fermentation process.

Considering that for those conversant with the art chicory does not constitute a basic product likely to develop a fermentation, as confirmed by the majority of ferments likely to be used in actual practice, according to the present invention a well-defined ferment type capable of reacting under certain conditions on a chicory base juice for starting a fermentation has been found.

It was thus discovered that a sugared chicory juice, i.e. a juice propitious to fermentation, could be fermented by a Kefir type ferment.

It is known that Kefir is a fermentation product of milk in which the lactose has undergone both alcoholic and lactic fermentation simultaneously.

This feature is inasmuch surprising that up to now the use of Kefir ferment was strictly limited to milk-base products.

As will be understood from the following description, certain cares must be taken for obtaining a fermentation reaction. In a first stage, the various criteria to be taken into account have been determined experimentally. Then, improvements have been brought to permit the manufacture of the product on a commercial scale.

Regarding the determination of the fermentation medium, parallel tests have been conducted for determining which was the best possible solution.

Chicory roots are particularly bitter and have a high inulin content. This component element of chicory is a linear glucofructosan or polysaccharide having a molecular weight in the range of 6,000 to 8,000. It is a kind of accumulation, in the roots, of the glucoses produced by the leaves through the chlorophyllian function. This reserve substance accumulates during the growth and may represent as much as 14% of the roots. Any inulin not metabolisable by the organism is degraded during the roasting step into hexoses, that is, sugars that are absorbed by direct assimilation.

In fact, glucose and fructose are absent in dried chicory roots and appear only during the heat treatment thereof. Fructose, glucose, saccharose and moderately polymerised oligosaccharides are extracted by using water at room temperature (cf. 'Cold water extraction' by Jakubczak and Beerens, 1973):

| Results expressed in grams for 100 g of dry substance | Total sugars | Reducing sugars |
|---|---|---|
| Dries chicory roots | 57.03 | 3.07 |
| Roasted chicory roots (3 hrs) | 63.82 | 27.69 |

Using warm water at 70° C. will solubilize the non-degraded inulin completely by roasting and also the more strongly polymerized sugars (7.28%).

Three procedures (maceration, infusion and decoction) may be adopted for obtaining this natural chicory solution.

As observed in the above-mentioned experiment, a nearly complete extraction is obtained by using cold water and on the other hand the infusion or decoction will free roasted chicory compounds likely to precipitate subsequently at low temperature. Under these conditions, maceration chicory, notably for sparing energy cost, appears to be the best method of obtaining a chicory juice.

Having thus adopted the maceration process, the various parameters involved therein have been analyzed.

Firstly regarding the maceration time, it was found that the dry extract increases from the onset very strongly during the first hour and then becomes stable.

Various chicory juices have been prepared at temperatures of 20° C., 40° C. and 55° C. respectively during three hours at the rate of 35 grams per liter. It was observed that in short the values of the resultant dry extracts varied only very slightly (with differences of less than 5 percent), so that one cannot assert that temperature constitutes a preponderant factor in the preparation process.

Various modes of agitation have also been tested for ascertaining their influence on the end product. In this case the differences between strongly or even moderately stirred products, on the one hand, and products not stirred at all, on the other hand, are rather pronounced. More particularly, a zero agitation inhibits a thorough extraction and is characterised by a moderate efficiency. On the other hand, even a moderate agitation is sufficient for dissolving nearly all of the extractable substances.

Finally, the influence of the dry chicory root dosage has been studied. This constitutes a very important parameter permitting of determining all the organoleptic characteristics of the chicory maceration. Many tests have been carried out and proved that even with relatively high dosages of the order of 45 g/liter the final dry extract varies linearly with the dose, and that no saturation in the dry substance contents takes place.

To sum up, though the use of a maceration temperature of 55° C. permits of reducing by about one hour the total treatment time, it is advised according to the present invention to limit the maceration temperature at 20° C. for a minimum treatment time of 2 hrs 30 min., while stirring moderately.

The dosage of dry chicory roots may be selected by sensorial metrology which showed that 35 g/liter constitutes the best dosage for meeting the desired requirements. The resultant color, bright brown, steady and deep, and the taste in which the bitter principles of chicory are more pronounced, meet perfectly the purpose contemplated.

Sugaring the product is necessary for two reasons: on the one hand for activating the fermentation and on the other hand for compensating the natural bitterness of chicory.

Laboratory tests proved that a 6% sugar proportion is adequate. The fermentation must be stopped necessarily before all the sugar has disappeared in order to obtain a proper equilibrium between the three necessary tastes: bitterness, acidity and sweetness.

In this respect, the use of granulated sugar, therefore, of pure saccharose, is not compulsory and other sugaring and fermentable products may be contemplated without any inconvenience. Thus, sugar beet molasses was tested. Molasses are uncrystallizable third-crop sirups left at the end of the beet root sugar extraction cycle.

This product is characterised by the following advantageous features:
 a sugar and nitrogen content likely to supply to microorganisms elements useful for their growth,
 its color enhances appreciably that of roasted chicory roots and the mixture changes from reddish brown to very bright intense black brown,
 it cuts production costs through a valorization of a by-product.

However, molasses have a very marked taste and a strong smell, and consequently its dose in the drink must be subordinate to its gustative perception threshold.

The average gustative perception threshold of molasses was set at 12 gram/liter through the absorption of gradually increased solutions. However, this low value reduces the economical advantage likely to derive from its commercial use. Nevertheless, as will be seen presently, the use of molasses is valuable in the fermentation process.

As mentioned hereinabove, the ferment that proved to be efficient with a sugared chicory solution is of the Kefir type. Only a few studies are available in the litterature concerning the qualitative and quantitative analyses of Kefir grains. At best it is admitted that Kefir microorganisms consist essentially of various lactic and yeast bacteria. This basic flora is completed sometimes with various other bacteria such as Bacillus, Acetobacter, etc.

The bacteriological study of Kefir grains having permitted the fermentation of sugared chicory juice led to the identification of five strains:
 *Lactobacillus casei alactosus,*
 *Lactobacillus cellobiosus,*
 *Leuconostoc dextranicum,*
 *Streptococcus lactis,*
 A yeast.

A deeper qualitative study led to the determination of the various component elements with the ferment proportions. Thus, a Kefir-type ferment was decomposed with the following division:

| | |
|---|---|
| *Lactobacillus casei alactosus* | $1.10^8$ cells/g |
| *Lactobacillus brevis/cellobiosus* | $1.10^8$ cells/g |
| *Streptococcus lactis* | $1.10^8$ cells/g |
| *Streptococcus diacelylactis* | $1.10^8$ cells/g |
| *Leuconostoc mesenteroids* | $1.10^8$ cells/g |
| *Saccharomyces florentinus* | $5.10^6$ cells/g |

A study of the seeding reproductibility in a fermentation medium as defined hereinabove has also been made.

This test led to the conclusion that successive sub-cultures caused an unpleasant taste to develop from the fourth sub-culture on.

As already explained in the foregoing, the use of molasses should be restricted on account of its pronounced taste. However, it was found that using molasses, not at the fermentation level but at the level of the preparation of the sediment (or fermenting liquid placed in the bottom of a vat which is then filled with unfermented liquid), was advantageous, notably for the standardization of the inoculum. Moreover, molasses, at a minimum dose of 81.6 g/liter, permits of keeping the balance between the various species of ferments utilized, by promoting notably the growth of lactic bacteria.

Fermentation control was also studied for determining the various parameters that can be used for detecting the time when the fermentation must be stopped.

The evolution of fermentation was observed by controlling the following factors:
 measuring the pH and determining the total acidity,
 dosing the alcohol,
 dosing the reducing sugars, and
 counting the total flora.

In a parallel manner the product is controlled by successive tastings.

The experiment was conducted by using volumes of five liters of sugared chicory juice fermented by 6 g of ferment.

The best criterion drawn from the continuous observation of the fermentation process is the control of the evolution of the total acidity, which is directly proportional to the taste of the product and constitutes an easy approach to a quick determination during the production cycle.

Watching over the alcohol rate which, according to the purpose contemplated, should be kept below one degree, is rather difficult in actual practice, hence the preference given to the total acidity rate.

Tests carried out according to the present invention showed that the product is satisfactory when the total acidity rate attained in 70 hours is 2.5%.

An experimental laboratory plant is illustrated diagrammatically in FIG. 1. This installation was used for preparing hundred twenty-four liters of product on a semi-commercial scale.

Hundred sixty liters of a 35 g/liter chicory maceration have been prepared in vat 1 (FIG. 1), and then filtered and introduced into the next vat 2 after a two-hour-and-a-half maceration.

The solution thus obtained was sugared with eight liters of a 135% sugar sirup, corresponding to 10.8 kg for eight liters.

The resultant sugared juice was sterilized and then introduced into a fermentation vat 3.

Ten liters of fermentation medium have been prepared from 12 grams of Kefir ferment and allowed to ferment during 48 hours. This culture in an exponential phase growth constituted the inoculum used for fermenting the initial 160 liters. After 70 hours, the total acidity rate was in fact 2.5%, the taste corresponding to the desired organoleptic criterion. In parallel thereto, an alcohol content of 6.2 g/liter was obtained.

The fermented drink was subsequently filtered in another vat 4 and eventually sterilized before canning at station 5.

After the filtration step, the product is dull, has lost its $CO_2$ content due only to the fact that the tests have not been carried out under pressure. If it is desired to restore its $CO_2$ content, a carbonation may be effected.

For preserving the product, it was found that a 20-minute pasteurisation at 72° C. was sufficient for warranting the stability of the product.

In fact, in certain non-pasteurised bottles it was observed that the product had undergone a certain contamination due to a yeast and to cocci.

Figure 2:
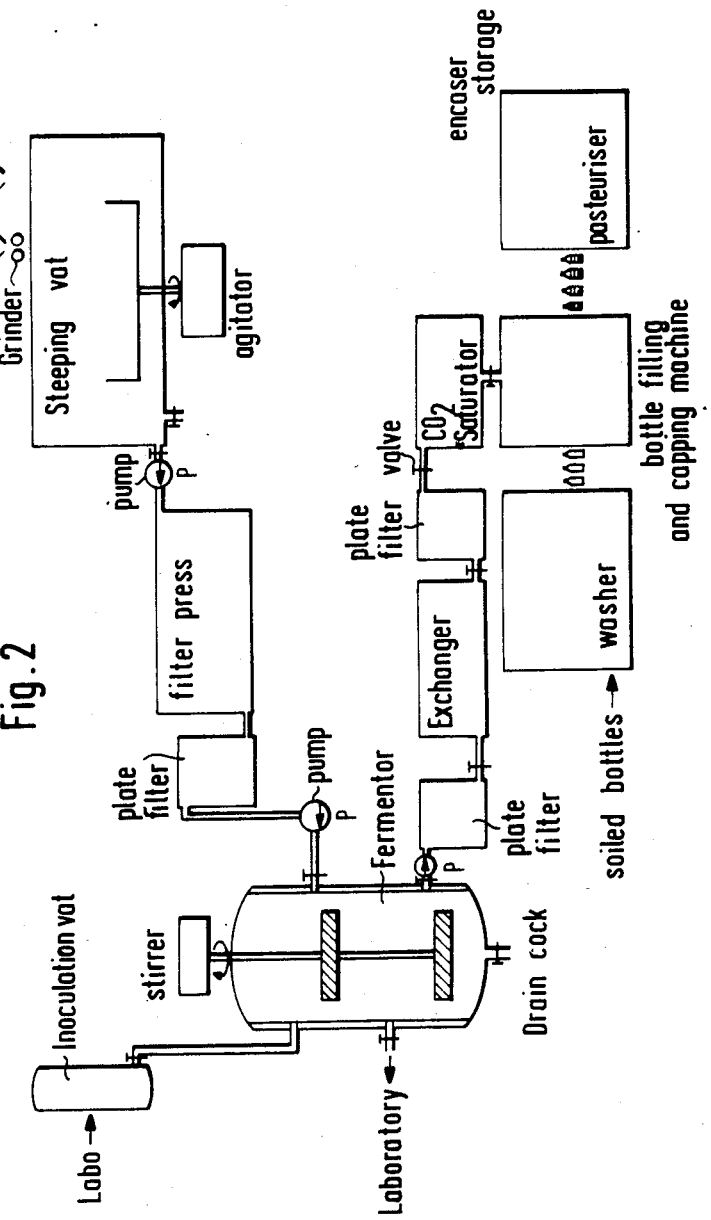

Regarding the really commercial production as illustrated diagrammatically in the case of a preferred form of embodiment in FIG. 2, various improvements have been brought.

Though a fermentation reaction in a concentrated chicory solution is particularly advantageous from the commercial point of view, it was observed that a priori chicory possesses Kefir inhibiting principles such that a high chicory content solution does not 'catch' Kefir-type ferments.

Therefore, the question is to elucidate if the fermentation is effective only with a low chicory concentration solution. Actually, it was observed that though this limitation was true for the first and second passages, higher concentration values could be used in the third and fourth passages of the chicory solutions without impairing the fermentation process. After the fourth passage, the ferment is strongly multiplied and destabilized and must therefore be discharged.

This property may advantageously be exploited for improving the efficiency of the production plant by using successive passages with a gradually increasing chicory concentration.

Of course, other forms of embodiment of the present invention may be contemplated by those conversant with the art without departing from the basic principles of the invention.

What is claimed as new is:

1. A process for the manufacture of a refreshing beverage based on chicory, comprising the step of:
    fermenting a base element, said base element being a sugared solution of extract of roasted chicory root, said fermentation being carried out by a Kefir-type ferment in which said Kefir-type ferment comprises the following strains: *Lactobacillus casei alactosus, Lactobacillus cellobiosus, Leuconostoc dextranicum, Streptococcus lactis* and a yeast.

2. The process according to claim 1, wherein said Kefir type ferment has the following composition:

| | |
|---|---|
| *Lactobacillus casei alactosus* | $1 \times 10^8$ cells/g |
| *Lactobacillus brevis/cellobiosus* | $1 \times 10^8$ cells/g |
| *Streptococcus lactis* | $1 \times 10^8$ cells/g |
| *Streptococcus diacetylactis* | $1 \times 10^8$ cells/g |
| *Leuconostoc mesenteroides* | $1 \times 10^8$ cells/g |
| *Saccharomyces Florentinus* | $5 \times 10^6$ cells/g |

3. The process according to claim 1, wherein said solution of roasted chicory extract, obtained by maceration, decoction or infusion of roasted roots, is sweetened and where the evolution, or rate, of said fermenting step is controlled in order to determine the completion of said fermentation step.

4. The process according to claim 3, wherein said solution of roasted chicory extract is sweetened so that the product obtained has a 6% saccharose concentration.

5. The process according to claim 3, wherein the sweetener comprises at least 81.60 grams/liter of molasses.

6. The process according to claim 3, wherein said solution of roasted chicory extract is prepared by macerating roots of 35 grams of chicory per liter, roasting said roots at a temperature of 20° C. for at least 2½ hours, and homogenizing said solution by continuous agitation.

7. The process according to claim 3, wherein the evolution of said fermenting step is controlled by controlling the following factors:
    pH value to determine acidity;
    alcohol dosage;
    total sugar dosage;
    reducing sugar dosage; and
    count of total flora.

8. The process according to claim 3, wherein said fermenting step is controlled by measuring the rate of acidity which is to attain 2.5% in 70 hours.

9. The process according to claim 3, further comprising the steps of:
    cooling said solution after said fermenting step is complete; and
    pasteurizing said solution, after said cooling step, at 72° C. for 20 minutes.

10. The process according to claim 3, wherein said fermenting step is carried out with said solution of roasted chicory extract initially having a low concentration of chicory and is run through several passes having a progressively higher concentration of chicory on each successive pass.

* * * * *